(12) United States Patent
Rabhi

(10) Patent No.: US 11,867,114 B2
(45) Date of Patent: Jan. 9, 2024

(54) GUIDE STUD VALVE

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 0 days.

(21) Appl. No.: 17/487,593

(22) Filed: Sep. 28, 2021

(65) Prior Publication Data
US 2022/0120208 A1 Apr. 21, 2022

Related U.S. Application Data

(60) Provisional application No. 63/092,703, filed on Oct. 16, 2020.

(51) Int. Cl.
*F02B 19/02* (2006.01)
*F02B 19/16* (2006.01)
*F02B 19/18* (2006.01)

(52) U.S. Cl.
CPC ............ *F02B 19/02* (2013.01); *F02B 19/165* (2013.01); *F02B 19/18* (2013.01)

(58) Field of Classification Search
CPC ........ F02B 19/02; F02B 19/165; F02B 19/18; Y02T 10/12
USPC ....................................... 123/292
See application file for complete search history.

(56) References Cited

U.S. PATENT DOCUMENTS

| | | | | |
|---|---|---|---|---|
| 1,038,462 A * | 9/1912 | Thompson | ................. | F02C 5/12 60/39.4 |
| 2,667,155 A * | 1/1954 | Paluch | .................. | F02D 19/024 123/189 |
| 4,854,281 A * | 8/1989 | Hareyama | ................ | F02B 19/02 123/255 |
| 4,892,070 A * | 1/1990 | Kuhnert | ................... | F02F 1/242 123/274 |
| 5,239,959 A * | 8/1993 | Loth | ........................ | F02B 77/11 123/289 |
| 5,454,356 A * | 10/1995 | Kawamura | ................ | F01L 9/20 123/292 |
| 6,073,604 A * | 6/2000 | Nakashima | ............. | F02B 19/02 123/270 |
| 6,354,263 B2 * | 3/2002 | Ibrahim | ................ | F02B 17/005 123/267 |
| 10,184,386 B2 * | 1/2019 | Jacob | .................... | F02B 19/108 |
| 2001/0050069 A1 * | 12/2001 | Oprea | ................ | F02M 51/0671 123/295 |

(Continued)

FOREIGN PATENT DOCUMENTS

| | | | | |
|---|---|---|---|---|
| DE | 102009049755 A1 * | 4/2011 | ............. | F02B 19/02 |
| FR | 3 061 743 A1 | 7/2018 | | |

(Continued)

*Primary Examiner* — Logan M Kraft
*Assistant Examiner* — Joshua Campbell
(74) *Attorney, Agent, or Firm* — NIXON & VANDERHYE

(57) ABSTRACT

The stud-oriented valve (50) includes a valve main body (8) which is housed in a lamination duct (7) and which exhibits a closure axial face (10) which can rest on a duct closure seat (11) for isolating a lamination cavity (4) from a combustion chamber (5), said body (8) also having a centering peripheral surface (12), an opening axial face (13) which may rest on a chamber-side valve stop (14), and at least one orientation stud (15) which protrudes from the opening axial face (13), said stud (15) being capable to slide through a guide axial orifice (17) that is fixed to the lamination duct (7).

10 Claims, 8 Drawing Sheets

(56) References Cited

U.S. PATENT DOCUMENTS

| | | | |
|---|---|---|---|
| 2009/0183710 A1* | 7/2009 | Philberth | F01L 1/38 |
| | | | 123/274 |
| 2014/0060480 A1* | 3/2014 | McClendon | F02B 19/108 |
| | | | 123/279 |
| 2016/0069250 A1* | 3/2016 | Loetz | F02B 19/02 |
| | | | 123/292 |
| 2016/0252005 A1* | 9/2016 | Jacob | F02M 21/0275 |
| | | | 137/537 |
| 2019/0072025 A1* | 3/2019 | Rabhi | F02B 19/18 |
| 2020/0080508 A1* | 3/2020 | Rabhi | F02B 19/1071 |

FOREIGN PATENT DOCUMENTS

| | | | |
|---|---|---|---|
| FR | 3 085 718 A1 | 3/2020 | |
| FR | 3 096 079 A1 | 11/2020 | |
| FR | 3 103 817 A1 | 6/2021 | |
| FR | 3 107 305 A1 | 8/2021 | |
| WO | WO-2018130772 A1 * | 7/2018 | F02B 19/02 |

* cited by examiner

[Fig. 1]
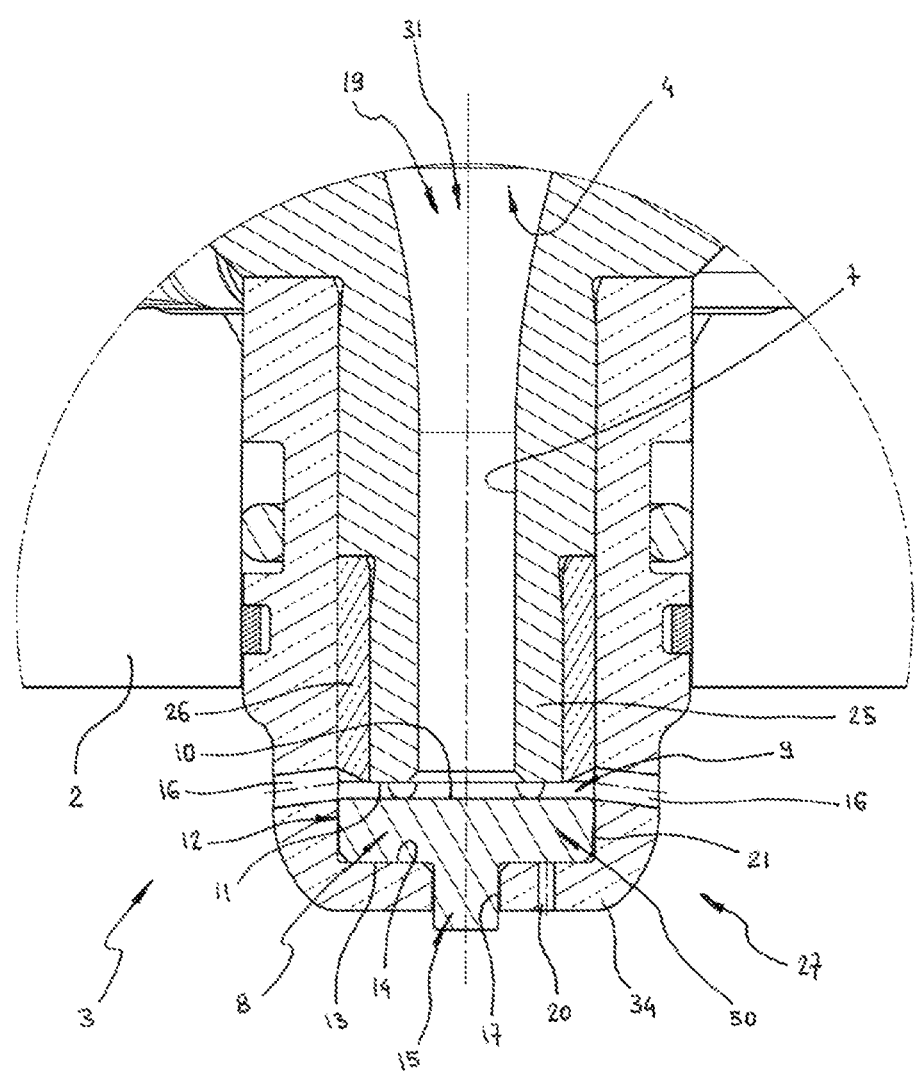

[Fig. 2]
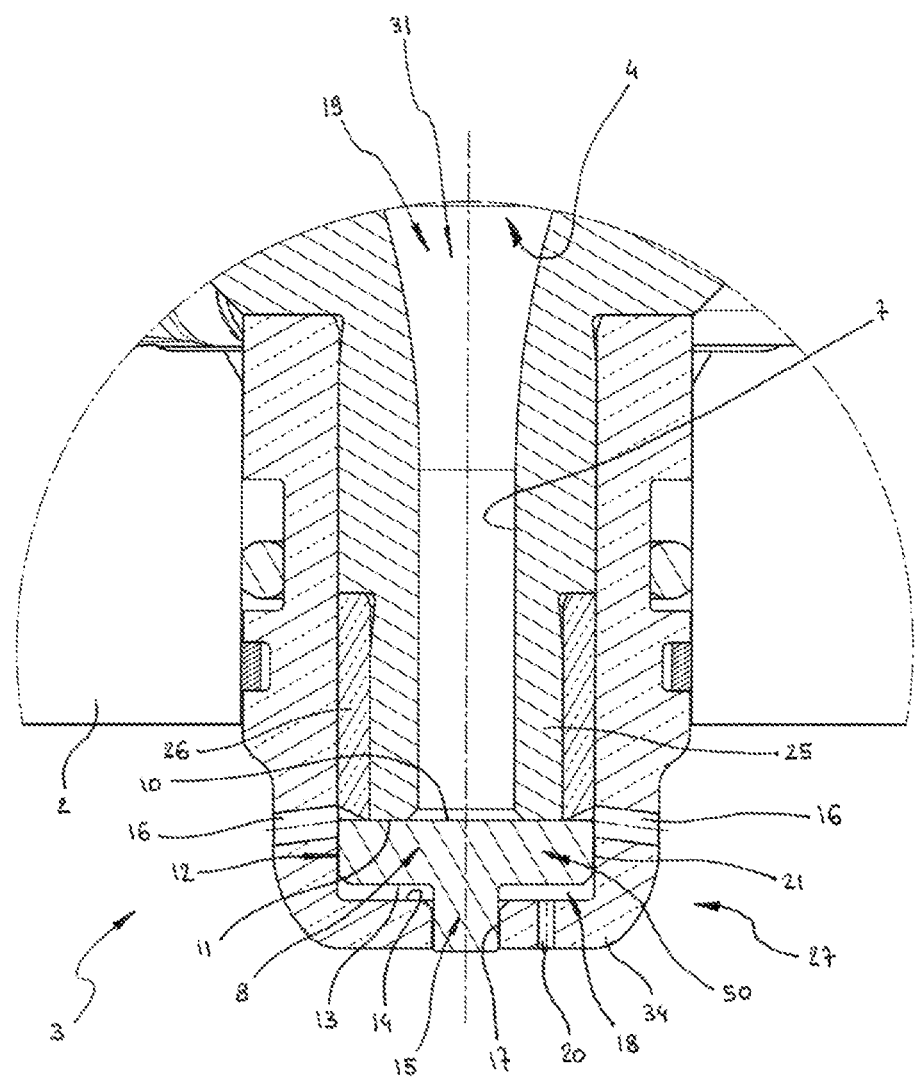

[Fig. 3]
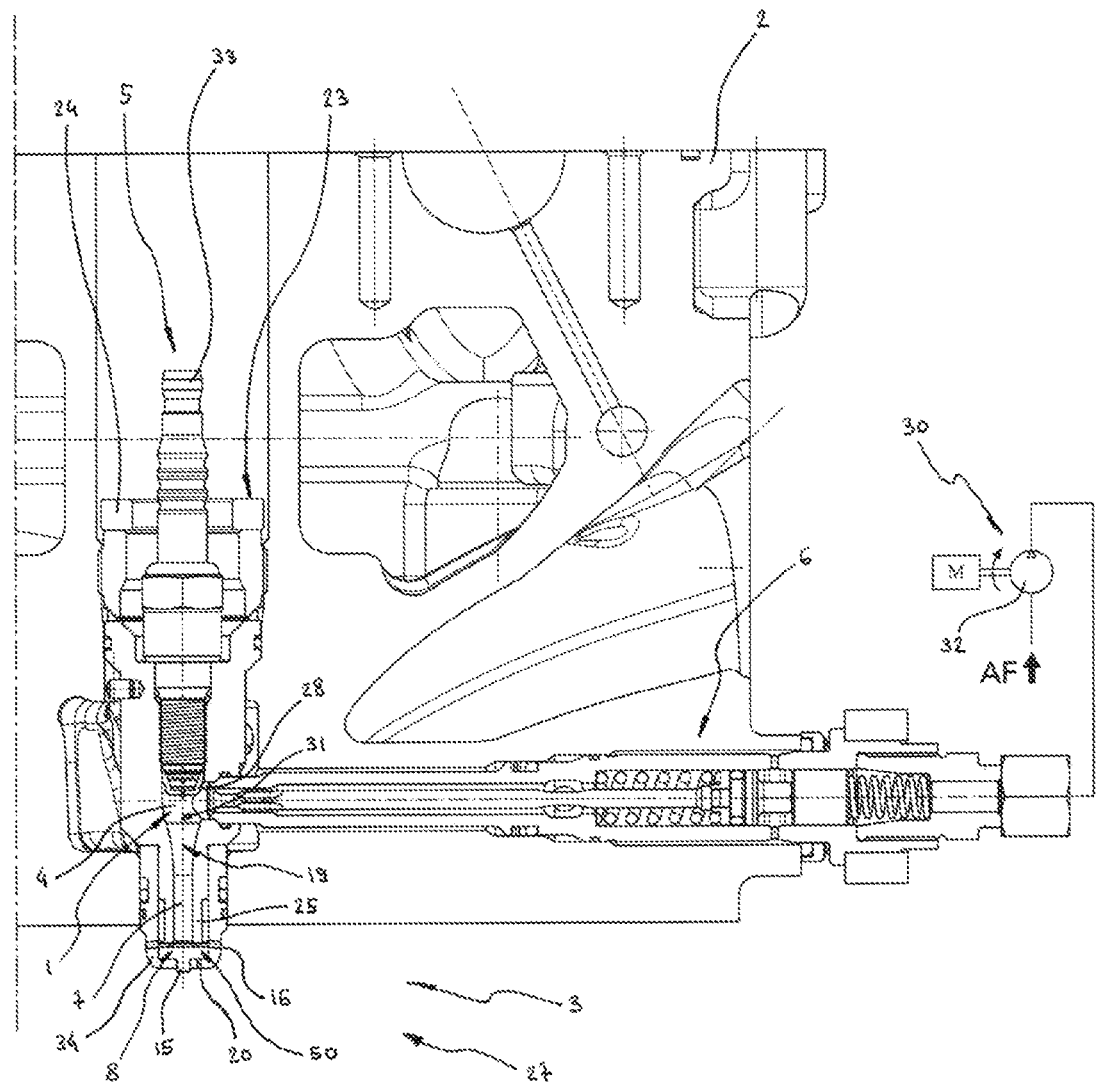

[Fig. 4]
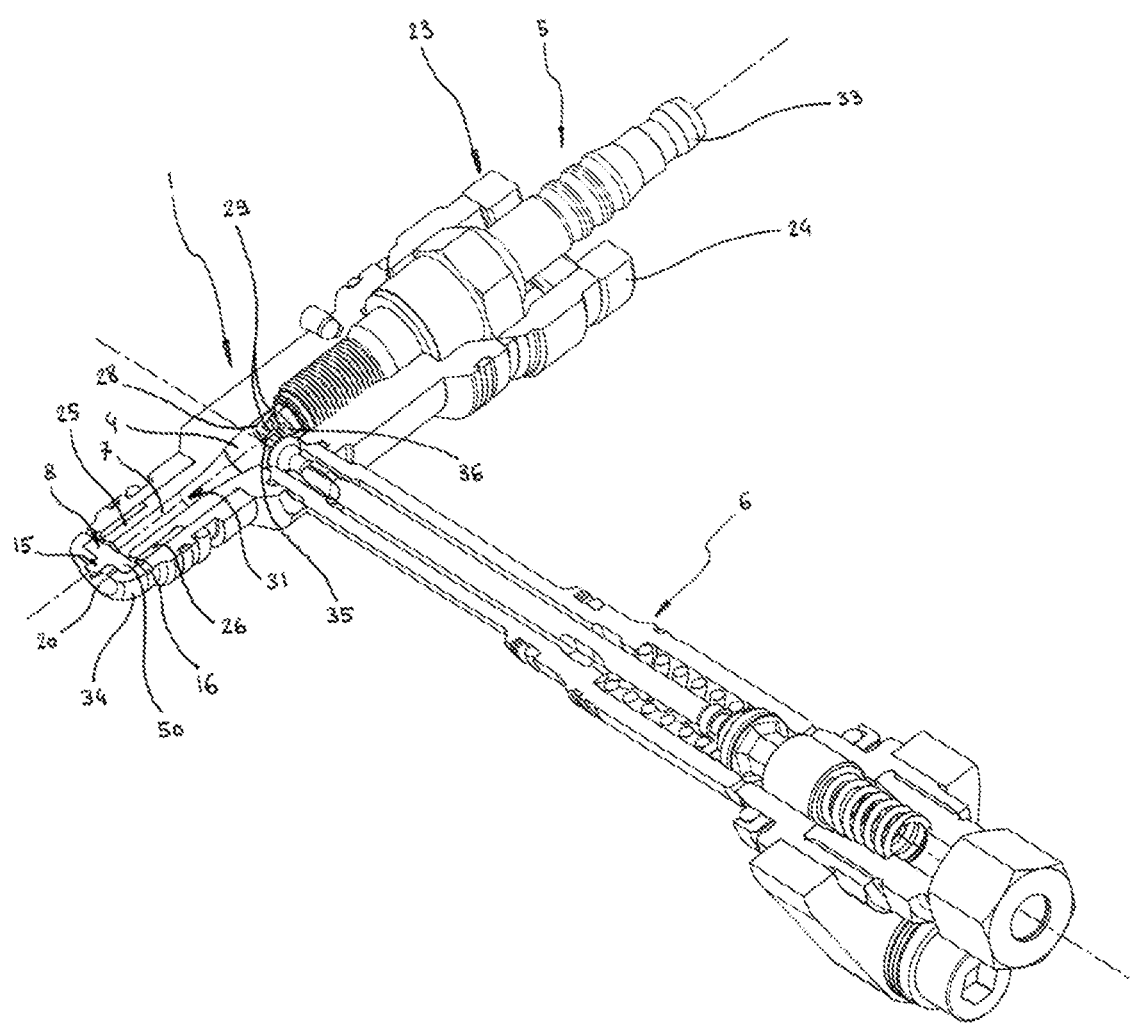

[Fig. 5]
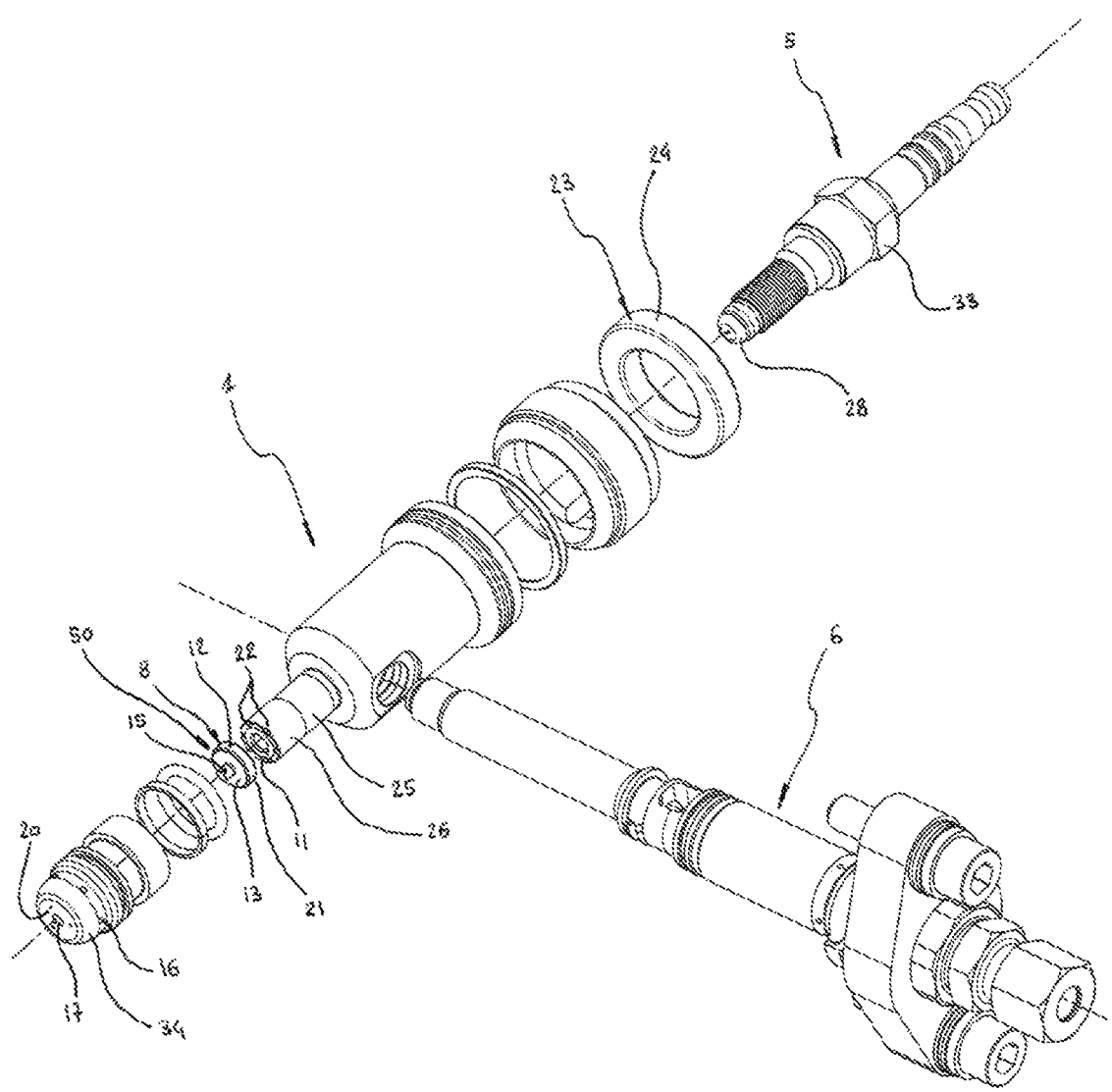

[Fig. 6]
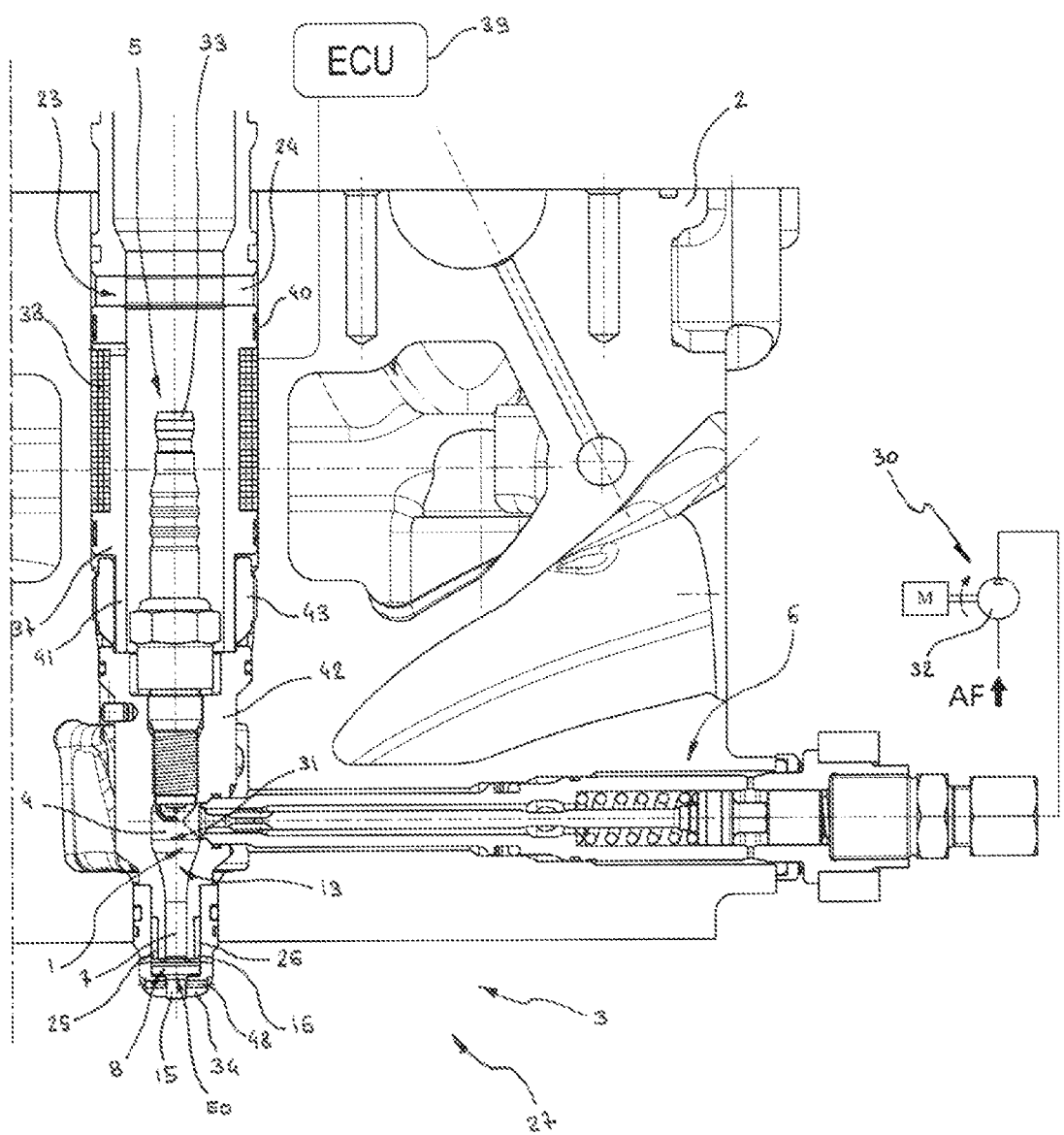

[Fig. 7]
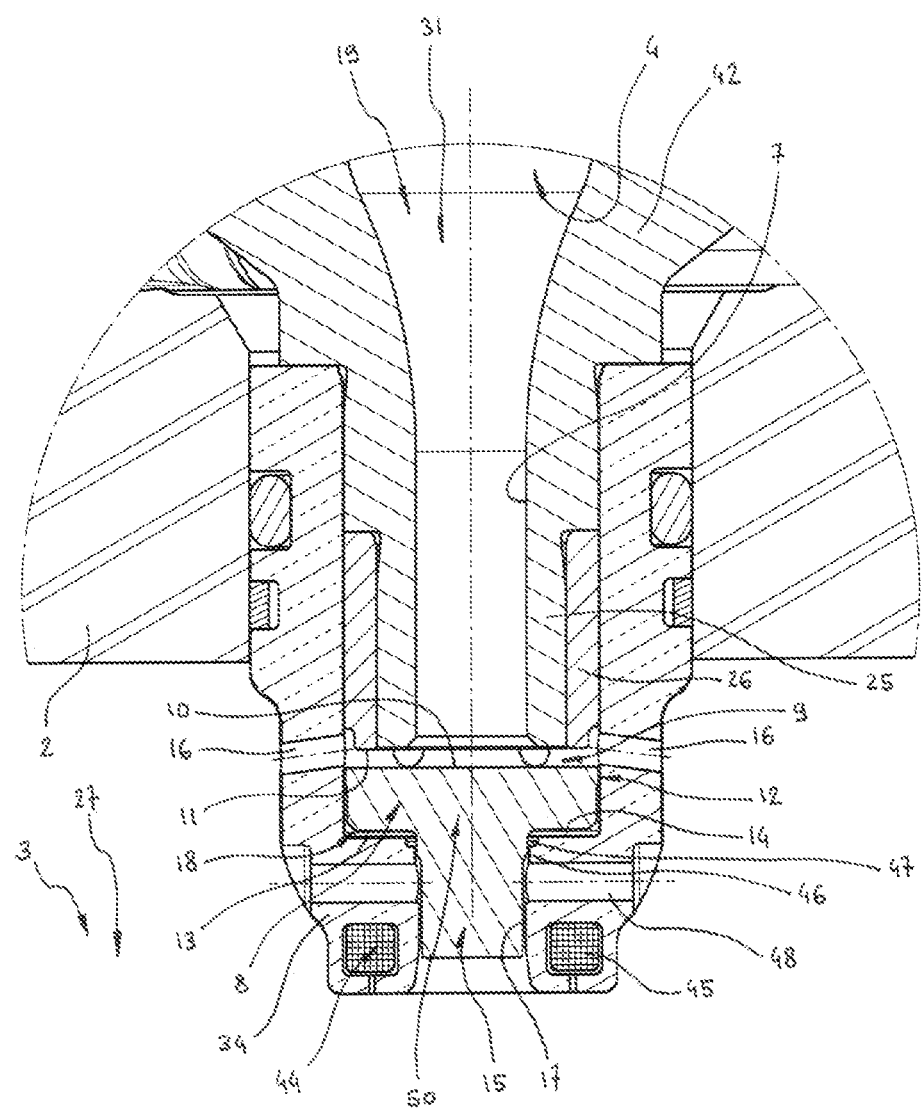

[Fig. 8]
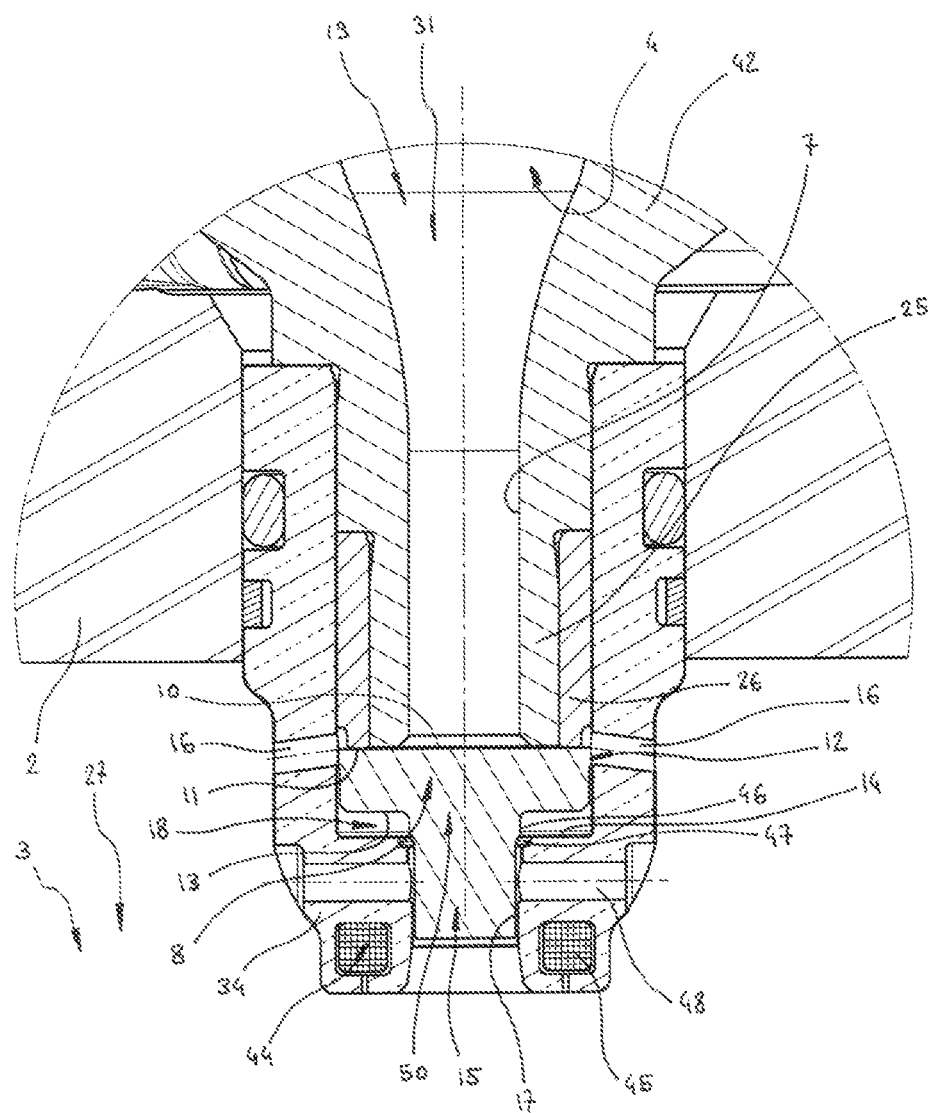

GUIDE STUD VALVE

BACKGROUND OF THE INVENTION

The present invention relates to a guide stud valve being an improvement of the ignition prechamber with valve that is the subject of patent No. FR 3,061,743 published on Aug. 16, 2019 and belonging to the applicant.

The guide stud valve according to the present invention is compatible with the main improvements of the valve ignition prechamber according to patent FR 3,061,743, said improvements having been the subject of several patent applications.

Among said improvements, can be noted the "valve magnetic return device" subject of French patent application No. 3,085,718 published on Mar. 13, 2020, or the "ignition insert with active prechamber" whose French patent application was filed on May 13, 2019 under No. 1904961, or the "reverse combustion direction valve ignition prechamber" which was the subject of French patent application No. 2001508 of 14 Feb. 2020.

All these patents and patent applications have in common that they present—as do most of the torch ignition devices according to the state of the art—an ignition prechamber formed by a lamination cavity arranged in the cylinder head of an internal combustion engine.

The strategy used by said patents, patent applications, and devices, is especially known by the Anglo-Saxon term of "Turbulent Jet Ignition".

According to said patents and patent applications, the lamination cavity is on the one hand, connected to the combustion chamber of the internal combustion engine by a lamination duct, and on the other hand, receives a lamination injector which can inject into said cavity a pilot load previously pressurized by compression means, said load consisting of an oxidizer-fuel mixture easily flammable by means of a spark.

It is noted that the combustion chamber receives in turn a main load which can be undiluted, or diluted either with air or with recirculated exhaust gases, the dilution making it possible in particular to maximize energy efficiency of the internal combustion engine.

Said patents and patent applications belonging to the applicant differ from the state of the prior art in that the lamination duct exhibits a valve closure seat on which a lamination valve can rest to close said duct. In doing so, said valve isolates the lamination cavity from the combustion chamber of the internal combustion engine.

When, on the other hand, said valve is moved away from said seat to rest on a chamber-side valve stop directly or via a damping chamber as disclosed in French patent application 3,085,718, said valve forms with the lamination duct, a torch ignition prechamber which communicates simultaneously, on the one hand, with the lamination cavity, and, on the other hand, with the combustion chamber via gas ejection orifices.

This particular configuration makes it possible to constitute in the lamination cavity a perfectly flammable pilot load whatever the nature and composition of the main load.

Indeed, the composition, the pressure and the temperature of the pilot load can be radically different from those of the main load.

This makes it possible to avoid one of the main drawbacks of "open" torch ignition prechambers—that is to say without a lamination valve—which, according to the state of the art, imply that if a gas mixture difficult to ignite forms the main load, said mixture also forms—in part and by inappropriate mixing—the pilot load in the ignition prechamber.

Thus, the pilot load is less capable of delivering high ignition power as the firing of the main load requires high ignition power.

Conversely, when the main load is formed from a slightly diluted and very reactive mixture which requires a low ignition power to prevent the combustion of said load from generating excessively high pressure gradients and noise in the main chamber, the pilot load is too energetic because it is partly formed of the mixture constituting the main load.

In other words, without the lamination valve to close the lamination duct, the pilot load is necessarily formed in part of the mixture constituting the main load. Under these conditions, the pilot load inherits some of the ignition and combustion susceptibility of the main load, which is contrary to need.

In fact, the less reactive the main load, the more powerful the pilot load must be. Conversely, the more easily and quickly the main load can be burnt, the less energetic the pilot load must be to avoid too rapid combustion of said main load.

This is why the valve ignition prechamber of patent FR 3,061,743 forms an autonomous torch ignition device, the power of which can be freely adjusted, in order to find the best compromise between efficiency, polluting emissions and acoustic emissions of the internal combustion engine which receives it.

This being explained, it can be seen from the figures presented in patent FR 3,061,743 and its various improvements that the lamination valve must have sufficient thickness so as not to crack despite the shocks that it undergoes when regularly entering in contact with its valve closure seat.

To prevent said valve from jamming in the lamination duct in which it is housed, either said valve must be very thick to the detriment of its weight becoming excessive, or said valve must have a truncated-spherical perimeter, and not a cylindrical perimeter, this in order to prevent jamming of said valve in its housing whatever its orientation with respect to the lamination duct.

The disadvantage of a valve with a truncated-spherical profile as shown in French patent application No. 1904961 is that said valve can—when it opens under the effect of the pressure of the gases to open the lamination duct—tilt relative to the lamination duct which accommodates it, and no longer remain parallel to the valve closure seat with which it cooperates.

The tilting of the lamination valve is all the more important if said valve is returned to its valve closure seat by a magnetic field as disclosed in French patent application 3,085,718.

Indeed, when in this particular context, said valve is returned by a magnetic field, the detachment of said valve from the valve closure seat with which it cooperates takes place in two steps.

In a first step, under the pressure of the gases, said valve detaches on one side only because for said pressure it is only a matter of exceeding the torque exerted by the magnetic field on said valve. The effort required for said detachment is of low intensity.

In a second step, the lamination valve being already tilted, the gas pressure must counter the closing attraction force exerted by the magnetic field on said valve, this so that the latter detaches completely from the valve closure seat while adopting an attitude more parallel to the latter. The effort required for this second detachment is several times greater than that required for the first detachment.

As can be understood from the above, if the lamination valve is returned to its valve closure seat by a magnetic field as proposed in French patent application 3,085,718—which is practically essential—and insofar as said valve has a truncated-spherical periphery to prevent it getting stuck in its housing, said valve can only tilt at a large angle.

The first drawback of this tilting is that it does not uncover all the gas ejection orifices simultaneously and in the same way, that is to say equally from one another.

As a result, on the one hand, the ignition torches made up of hot gases are not emitted at the same time in the main chamber via the torch ignition prechamber, and, on the other hand, said torches do not all have the same propensity to ignite the main load both in terms of thermal and aerodynamic power and in terms of physicochemical reactivity.

This double behavioral inhomogeneity of the torches with respect to each other seriously impairs the homogeneity of combustion of the main load in the main chamber.

Said inhomogeneity can produce knocking, i.e. abnormal combustion of the main load which can damage the internal combustion engine. In addition, said inhomogeneity inevitably produces cyclic dispersion with slow main load combustions which follow rapid combustions of said load, and vice versa.

Said cyclic dispersion is detrimental to the energy efficiency and to the vibro-acoustic behavior of said engine.

The unintended tilting of the lamination valve in question here does not only occur when said valve opens, but also when it closes, when said valve comes to rest again on the valve closure seat with which it cooperates.

Temporal dispersions in the closure of the lamination valve result from this tilting on the one hand, and leak failures between said valve and the valve closure seat on the other hand, said failures being expressed by the undesirable passage of gas from the main chamber to the lamination cavity.

Said passage can lead to large variations in the initiation and development of the combustion of the pilot load in the lamination cavity from one cycle to another, this because said pilot load comprises—from one cycle to the other— more or less gas from the main load.

Said combustion variations lead to emissions of torches in the main chamber more or less early, more or less powerful, more or less hot, and more or less reactive from one cycle to another. This leads to making the combustion of the main load unstable from one cycle to another, again to the detriment of the energy efficiency and the vibro-acoustic behavior of the internal combustion engine.

Another adverse consequence of the erratic behavior of the valve in orientation and sealing is a high equilibrium temperature of said valve. Indeed, due to said valve resting poorly on the valve closure seat with which it cooperates, said valve also cools poorly in contact with said seat.

As a result, in operation, the lamination valve can reach excessive temperatures which can lead—by thermal expansion—to the jamming of said valve in the lamination duct in which it is housed.

SUMMARY OF THE INVENTION

For particularly resolving these various behavioral problems of the lamination valve of the valve ignition prechamber according to patent FR 3,061,743 the guide stud valve according to the invention advantageously replaces the lamination valve described in said patent and its improvements, said stud valve being kept approximately parallel— throughout its travel path in the lamination duct—to the valve closure seat with which it cooperates.

In particular, it results from the guide stud valve according to the invention that:

All ignition torches are emitted by the torch ignition prechamber approximately simultaneously and at the same power;

The power, composition, aerodynamic behavior and physicochemical reactivity of the torches emitted into the combustion chamber of the internal combustion engine by the torch ignition prechamber are controlled and similar from one torch to another;

The safety and energy efficiency of the internal combustion engine are maximized;

The vibro-acoustic behavior of said engine is optimized;

The cooling of said valve is correctly ensured in all circumstances, including when the internal combustion engine operates at high power.

In addition, by replacing the lamination valve, the guide stud valve according to the invention advantageously increases the durability and robustness of the valve ignition prechamber according to patent FR 3,061,743 as a whole, by preventing any risk of mechanical jamming of said stud valve in the lamination duct which houses it, and by limiting the abrasive wear of said valve and said duct.

In addition, the guide stud valve according to the invention takes better advantage of and optimizes the operation of the damping chamber described in French patent application No. 3,085,718.

It is to be understood that the guide stud valve according to the invention can be applied not only to the valve ignition prechamber according to patent FR 3,061,743, but also to any other application similar in concept and principle which could advantageously take advantage of the characteristics and functionalities of said valve.

The oriented valve for a valve ignition prechamber arranged in an internal combustion engine cylinder head which covers a combustion chamber, which prechamber comprising a lamination cavity in which ignition means and at least one lamination injector emerge, said cavity being connected to the combustion chamber by a lamination duct which accommodates said valve in order to be capable to form with the latter a torch ignition prechamber which puts the lamination cavity in relation to the combustion chamber via at least one gas ejection orifice, includes:

A valve main body housed with small play in the lamination duct;

A closure axial face arranged on the valve main body which may, in whole or in part, rest on a duct closure seat of the lamination duct in order to close said duct and isolate the lamination cavity of the combustion chamber;

At least one centering peripheral surface arranged at the periphery of the valve main body; said surface can come into contact with the inner wall of the lamination duct to center said body in said duct;

An opening axial face which is arranged on the valve main body opposite the closure axial face and which, when the closure axial face is not resting on the duct closure seat, can rest on a chamber-side valve stop arranged in the lamination duct;

At least one orientation stud which is fixedly secured to the valve main body and which protrudes from the opening axial face;

At least one guide axial orifice which is arranged in or near the chamber-side valve stop and in which is housed the orientation stud with small radial play, said stud being capable to slide longitudinally in said orifice without ever fully coming out of it;

And a valve damping chamber formed by the lamination duct, the opening axial face and the chamber-side valve stop, the volume of which is at its maximum when the closure axial face rests on the duct closure seat, and at its minimum when the opening axial face rests on the chamber-side valve stop.

The oriented valve according to the invention comprises a guide axial orifice which passes through the lamination duct so as to connect the valve damping chamber and the combustion chamber, so that a gas can flow between said chambers, via the small radial play left between the orientation stud and the guide axial orifice.

The oriented valve according to the invention comprises at least one gas throttling orifice which connects the valve damping chamber and the combustion chamber so that a gas can flow between said chambers, via said orifice.

The oriented valve according to the invention comprises a centering peripheral surface which has a conical profile.

The oriented valve according to the invention comprises a gas ejection orifice which is connected to the torch ignition prechamber via at least one gas ejection slot arranged in the lamination duct and in the vicinity of the duct closure seat.

The oriented valve according to the invention comprises a valve main body and/or an orientation stud which is attracted in the direction of the lamination cavity by a closure magnetic field source.

The oriented valve according to the invention comprises a closure magnetic field source consisting of at least one closure permanent magnet which produces a magnetic field, which may be countered or amplified by a respectively opposite or matching magnetic field induced in a piloting coil core by a magnetic field piloting coil.

The oriented valve according to the invention consists of a valve main body and/or an orientation stud which is attracted towards the chamber-side valve stop by an opening magnetic field source.

The oriented valve according to the invention includes an orientation stud which has a damping shoulder which cooperates with a damping counterbore arranged at the inlet of the guide axial orifice, said counterbore emerging in the valve damping chamber.

The oriented valve according to the invention includes a damping counterbore which is directly or indirectly connected to the combustion chamber by at least one depressurization duct.

The oriented valve according to the invention includes a lamination duct which includes a directly-mounted non-magnetic sleeve on which the duct closure seat is arranged.

BRIEF DESCRIPTION OF THE DRAWINGS

The following description of the attached drawings, which are supplied as non-exhaustive examples, will provide a better understanding of the invention, the features thereof, and the potential benefits it can provide:

FIG. 1 is an enlarged schematic sectional view of the guide stud valve according to the invention, said valve being in the "open" position in the lamination duct so that the opening axial face rests on the chamber-side valve stop, said valve forming with the lamination duct a torch ignition prechamber which puts the lamination cavity in relation with the combustion chamber through gas ejection orifices.

FIG. 2 is an enlarged schematic sectional view of the guide stud valve according to the invention and according to the variant shown in FIG. 1, said valve being in the "closed" position in the lamination duct so that the closure axial face of said valve rests on the duct closure seat and the lamination cavity no longer communicates with the combustion chamber.

FIG. 3 is a schematic sectional view of the cylinder head of an internal combustion engine as it can be designed for receiving the guide stud valve according to the invention by means of an ignition insert with active prechamber such as described in French patent application No. 1904961, said valve being returned to closing by the valve magnetic return device which is the subject of French patent application No. 3,085,718, the lamination injector which emerges into the cavity lamination being part of the cam hydraulic injection system which was the subject of French patent application No. 1913528 of Nov. 29, 2019, the lamination cavity receiving an inverter enclosure as provided for in the French Patent application No. 20 01508 entitled "Reverse combustion direction valve ignition prechamber".

FIG. 4 is a three-dimensional sectional view of the guide stud valve according to the invention and according to the variant and environment shown in FIG. 3, but without the internal combustion engine cylinder head.

FIG. 5 is an exploded three-dimensional view of the guide stud valve according to the invention and the variant and environment shown in FIG. 3, but without the internal combustion engine cylinder head.

FIG. 6 is a schematic sectional view of the cylinder head of an internal combustion engine as it can be designed for receiving the guide stud valve according to the invention by means of an ignition insert with active prechamber such as described in French patent application No. 1904961, said valve being returned to closing by a magnetic field produced by a closure permanent magnet; said field can be countered or amplified by a respectively opposite or matching magnetic field induced in a piloting coil core by a magnetic field piloting coil.

FIG. 7 is an enlarged schematic sectional view of a variant of the guide stud valve according to the invention, according to which said valve receives a damping shoulder which cooperates with a damping counterbore arranged at the inlet of the guide axial orifice, the valve main body being attracted towards the chamber-side valve stop by an annular opening permanent magnet integral with a non-magnetic prechamber nose, said valve being in the "open" position so as to form with the lamination duct a torch ignition prechamber.

FIG. 8 is an enlarged schematic sectional view of the guide stud valve according to the invention and according to the variant shown in FIG. 7, said valve being in the "closed" position in the lamination duct so that the closure axial face of said valve rests on the duct closure seat and the lamination cavity no longer communicates with the combustion chamber.

DESCRIPTION OF THE INVENTION

The guide stud valve 50 according to the invention, various details of its components, variants, and accessories have been shown in FIGS. 1 to 8.

As shown in FIGS. 3 to 6, the stud-oriented valve 50 is primarily provided for a valve ignition prechamber 1, which may be arranged in an internal combustion engine cylinder head 2 as shown in FIGS. 3 and 6, said cylinder head capping a combustion chamber 3.

It is noted in FIGS. 1 to 4 and 6 to 8 that the valve ignition prechamber 1 comprises a lamination cavity 4 into which ignition means 5 and at least one lamination injector 6 emerge, as shown in FIGS. 3 to 6.

As can be seen in FIGS. 1 to 4 and 6 to 8, the lamination cavity 4 is connected to the combustion chamber 3 by a lamination duct 7 which houses the guide stud valve 50 according to the invention in order to be able to form with the latter—as is clearly shown in FIGS. 1 and 7—a torch ignition prechamber 9 when said valve 50 is in the "open" position.

FIGS. 1 and 7 show in fact that the torch ignition prechamber 9 connects the lamination cavity 6 to the combustion chamber 5 through at least one gas ejection orifice 16.

In FIGS. 1 to 8, it can be seen that the guide stud valve 50 according to the invention comprises a valve main body 8 accommodated with small play in the lamination duct 7.

As a variant, but not shown, of the guide stud valve 50 according to the invention, the valve main body 8 may comprise an indexing stud which prevents it from rotating about its longitudinal axis.

Such a stud may be provided, in particular, if openings (not shown) are provided in the periphery of the valve 50, each of which opens a gas ejection opening 16 when a closure axial face 10 of the valve 50 moves away from a duct closure seat 11 of the lamination duct 7.

Particularly in FIGS. 1, 2, 7 and 8, it can be seen that the guide stud valve 50 according to the invention has a closure axial face 10 arranged on the valve main body 8 which can receive on its surface, according to a not shown embodiment of the guide stud valve 50 according to the invention, at least one flow channel to channel the gases to the gas ejection orifice 16.

As shown in FIGS. 2 and 8, the closure axial face can rest, in whole or in part, on a duct closure seat 11 of the lamination duct 7, in order to seal the said duct 7 and to isolate the lamination cavity 4 from the combustion chamber 5.

It is noted that, according to a not shown variant, the closure axial face 10 may advantageously have an aerodynamic dome which promotes the flow of a gas 19 between the lamination duct 7 and the torch ignition prechamber 9, such dome being similar to that provided for in the patent FR 3,061,743 belonging to the applicant.

FIGS. 1 to 8 show that the guide stud valve 50 according to the invention includes at least one centering peripheral surface 12 arranged at the periphery of the valve main body 8, said surface 12 being capable to come into contact with the inner wall of the lamination duct 7 for centering said body 8 in said duct 7.

It is noted that the centering peripheral surface 12 can be advantageously connected to the closure axial face 10 and/or the opening axial face 13 by means of chamfers, strips or spokes, this being provided to avoid excessive contact pressure between the valve main body 8 and the lamination duct 7 that houses it.

In FIGS. 1 to 8, it is noted that the guide stud valve 50 according to the invention has an opening axial face 13 which is arranged on the valve main body 8 opposite the closure axial face 10 and which, when the closure axial face 10 does not rest on the duct closure seat 11, may rest on a chamber-side valve stop 14 arranged in the lamination duct 7.

FIGS. 1 to 8 clearly show that the guide stud valve 50 according to the invention has at least one orientation stud 15 which is firmly attached to the valve main body 8 and which protrudes from the opening axial face 13.

In FIGS. 1, 2, 5, 7 and 8, it is clearly seen that the guide stud valve 50 according to the invention comprises at least one guide axial orifice 17 which is arranged in or near the chamber-side stop valve 14, and in which the orientation stud 15 is housed with small radial play, said stud 15 being capable to slide longitudinally in said orifice 17 without ever coming out entirely.

It is to be noted that advantageously, the guide stud valve 50 according to the invention can be wholly or partially coated with a material with a low coefficient of friction and resistant to abrasive wear, such as a "Diamond Like Coating" or a physical vapor deposition such as "Ionbond 90", the internal surfaces of the lamination duct 7 which come into contact with said valve 50 being for example wholly or partly coated with chemical nickel.

It is particularly visible in FIGS. 2 and 7 that, on the guide stud valve 50 according to the invention, the lamination duct 7, the opening axial face 13 and the chamber-side valve stop 14 form a valve damping chamber 18, the volume of which is maximum when the closure axial face 10 rests on the duct closure seat 11, and minimum when the opening axial face 13 rests on the chamber-side valve stop 14.

It is to be noted that according to a particular embodiment, not shown, of the guide stud valve 50 according to the invention, pockets can be arranged on the surface of the chamber-side valve stop 14 so that when the opening axial face 13 rests on said stop 14, the residual volume of the valve damping chamber 18 is increased.

As shown in FIGS. 1 to 8, the guide axial orifice 17 can advantageously pass right through the lamination duct 7 so as to connect the valve damping chamber 18 and the combustion chamber 3, so that a gas 19 can circulate between said chambers 18, 3 via the small radial play left between the orientation stud 15 and the guide axial orifice 17.

In FIGS. 1 to 5, it has been shown that at least one gas throttle orifice 20 can connect the valve damping chamber 18 and the combustion chamber 3 so that a gas 19 can flow between said chambers 18, 3 via said orifice 20.

It has been shown in FIGS. 1 and 2 that the centering peripheral surface 12 of the guide stud valve 50 according to the invention may have a conical profile 21 so as to let the valve main body 8 substantially orient itself with respect to the lamination duct 7, this being provided to ensure that the closure axial face 10 can lie flat on the duct closure seat 11 with which it cooperates.

As can be seen clearly in FIG. 5, the gas ejection orifice 16 can be connected to the torch ignition prechamber 9 via at least one gas ejection slot 22 arranged in the lamination duct 7 and in the vicinity of the duct closure seat 11.

Advantageously, said slot 22 channels a hot gas 19 coming from the lamination cavity 4 via the lamination duct 7 so that, on the one hand, said gas cools as little as possible, in particular on contact with said duct 7, before being ejected into the combustion chamber 3 via the gas ejection orifice 16, and that, on the other hand, the flow of said gas 19 is facilitated.

It has been shown in FIGS. 3 to 5 that the valve main body 8 and/or the orientation stud 15 of the guide stud valve 50 according to the invention can be attracted in the direction of the lamination cavity 4 by a closing magnetic field source 23 which can be a closure permanent magnet 24 or a coil of conductive wire, following the example provided by the valve magnetic return device which is the subject of French patent application number 3,085,718 published on 13 Mar. 2020.

In this case, the valve main body 8 should preferably and mainly be made of a magnetic material such as steel, stainless or not.

In FIGS. 3 to 6, it has admittedly been shown that the closing magnetic field source 23 may consist of at least one closure permanent magnet 24 that produces a magnetic field.

However, in FIG. 6, it has been shown that the magnetic field produced by said permanent magnet 24 can be either countered or amplified by a respectively opposite or matching magnetic field induced in a piloting coil core 37 by a magnetic field piloting coil 38, the electric current that flows through said coil 38 being controllable by a calculator 39.

According to this particular configuration of the guide stud valve 50 according to the invention, the magnetic field piloting coil 38 can, depending on the intensity and direction of the current flowing through it, cancel the magnetic return of the guide stud valve 50 on the duct closure seat 11 produced by the closure permanent magnet 24, reinforce said magnetic return, or vary the strength of said magnetic return over time scales ranging from a few degrees of rotation of a crankshaft of an internal combustion engine, to several seconds or even several minutes.

It can be seen in FIG. 6 that the piloting coil core 37 may comprise at its periphery at least one cooling ring 40 which creates a thermal bridge between said core 37 and the part in which said core 37 is housed, in order to contribute to the proper cooling of said core 37.

As can be seen in FIG. 6, the piloting coil core 37 may comprise magnetic support means 41 that bear directly on an active prechamber ignition insert 42, passing for this purpose through insert clamping means 43 that hold said insert 42 in the internal combustion engine cylinder head 2.

FIGS. 7 and 8 illustrate that the valve main body 8 and/or the orientation stud 15 may be attracted towards the chamber-side valve stop 14 by an opening magnetic field source 44, which may be an annular opening permanent magnet 45 integral with a non-magnetic prechamber nose 34.

Said magnet 45 can be made of "AlNiCo", a material known in itself to withstand high temperatures, shocks, and corrosion.

This particular configuration of the guide stud valve 50 according to the invention can be advantageously combined with that shown in FIG. 6, where a closure permanent magnet 24 attracts the valve main body 8 and/or the orientation stud 15 in the direction of the lamination cavity 4; the magnetic field of said permanent magnet 24 can either be controlled or amplified by a respective opposite or matching magnetic field induced in a piloting coil core 37 by a magnetic field piloting coil 38; the electrical current passing through said coil 38 can be controlled by a calculator 39.

This combination of means makes it possible in particular to open or close dynamically the guide stud valve 50 depending on whether the magnetic fields produced respectively by the closure permanent magnet 24, the opening permanent magnet 45 and the magnetic field piloting coil 38 result in a magnetic field at the level of the guide stud valve 50 tending to press said valve 50 on the valve seat 11 or on the chamber-side valve stop 14.

As a variant, the guide stud valve 50 can itself be permanently magnetized so as to be attracted or repelled by the magnetic field produced by the closure permanent magnet 24 and/or the magnetic field piloting coil 38.

For this purpose, said valve 50 may incorporate a permanent magnet, attached to any of the surfaces of said valve 50, or integrated in whole or in part inside it.

According to a particular variant of the guide stud valve 50 according to the invention shown in FIGS. 6 to 8, the orientation stud 15 may have a damping shoulder 46 which cooperates with a damping counterbore 47 arranged at the inlet of the guide axial orifice 17, said counterbore 47 emerging in the valve damping chamber 18, the relative position of said shoulder 46 and counterbore 47 being so provided that so that when the guide stud valve 50 has traveled a certain distance in its movement from the duct closure seat 11 to the chamber-side valve stop 14, the damping shoulder 46 comes to the level of the damping counterbore 47 in order to restrict the passage which is left for the gases contained in the valve damping chamber 18 to go to the combustion chamber 3 via the radial play left between the orientation stud 15 and the guide axial orifice 17.

It is noted that the damping counterbore 47 can be confused with the chamber-side valve stop 14, or even replaced by a protuberance.

It has been shown in FIGS. 6 to 8 that the damping counterbore 47 can be directly or indirectly connected to the combustion chamber 3 by at least one depressurization duct 48 through which the gases contained in the valve damping chamber 18 can freely move towards the combustion chamber 3 as long as the damping shoulder 46 has not yet reached the level of the damping counterbore 47 while the guide stud valve 50 moves from the duct closure seat 11 towards the chamber-side valve stop 14.

It has been shown in FIGS. 6 to 8 that the lamination duct 7 can include a directly-mounted non-magnetic sleeve 26 on which the duct closure seat 11 is arranged; said sleeve 26 can be mounted fretted around a gas ejection tube 25 formed by the lamination duct 7.

In this case, the directly-mounted non-magnetic sleeve 26 can advantageously be made of "Inconel", a material which has high mechanical characteristics at high temperatures.

It is noted in FIGS. 7 and 8 that a slight axial offset can be provided between the duct closure seat 11 arranged on the directly-mounted non-magnetic sleeve 26 and the end of the gas ejection tube 25, said offset allowing the pressure to come between said tube 25 and the closure axial face 10 so as to facilitate the opening of the guide stud valve 50 by the pressure of the gases contained in the lamination cavity 4.

Operation of the Invention:

The operation of the guide stud valve 50 according to the invention is easily understood from the view of FIGS. 1 to 8.

In FIGS. 1 and 2 and FIGS. 7 and 8, it is noted that the lamination duct 7 is, by way of non-limiting example, made up of at least three distinct portions.

Firstly, said duct 7 comprises a gas ejection tube 25 made of a magnetic material, in this case stainless steel with high magnetic permeability and low magnetic remanence, said tube 25 receiving the duct closure seat 11 in FIGS. 1 to 5.

Secondly, the lamination duct 7 comprises a directly-mounted non-magnetic sleeve 26 which is for example made of copper or of "Inconel", and which is mounted fretted on the gas ejection tube 25. According to the variants shown in FIGS. 6 to 8, the directly-mounted non-magnetic sleeve 26 receives the duct closure seat 11 and not the gas ejection tube 25, thus contrary to what is shown in FIGS. 1 to 5.

Finally and thirdly, the lamination duct 7 comprises a non-magnetic prechamber nose 34 made of copper or stainless steel, coated or not with an anti-friction material with high abrasive resistance. Said nose 34 is mounted fretted astride the gas ejection tube 25 and the directly-mounted non-magnetic sleeve 26. In addition, said nose 34 houses with small play the guide stud valve 50 and receives the chamber-side valve stop 14.

As can particularly be seen in FIGS. 2, 7 and 8, the non-magnetic prechamber nose 34 forms, together with the guide stud valve 50, a valve damping chamber 18, which is connected to the combustion chamber 3 on the one hand, via the gap formed by the small radial play left between the orientation stud 15 and the guide axial orifice 17, and on the other hand, and only according to the configuration shown in FIGS. 1 to 5, via a gas throttle orifice 20.

As is clear from FIGS. 1, 2, 7 and 8, the orientation stud 15 can slide longitudinally in the guide axial orifice 17 without ever coming out completely.

The play left between the orientation stud 15 and the guide axial orifice 17 has been calculated to allow the guide stud valve 50 to tilt sufficiently to compensate for any non-perpendicularity between the gas ejection tube 25 and the duct closure seat 11, i.e., to ensure that the closure axial face 10 can make full contact over its entire surface with said seat 11.

A slight tilting of the guide stud valve 50 is possible in that only a peripheral contact line of very short axial length located on the centering peripheral surface 12 and in the vicinity of the closure axial face 10 actually contacts the inner wall of the lamination duct 7, which in this case happens to be the inner wall of the non-magnetic prechamber nose 34.

It may be noted in FIGS. 1 and 2 that, as an example of the design of the guide stud valve 50 according to the invention, the centering peripheral surface 12 arranged at the periphery of the valve main body 8 has a conical profile 21 so as to allow said body 8 to be substantially oriented with respect to the lamination duct 7, this without said conical profile 21 ever coming into contact over its entire height with the inner wall of the non-magnetic prechamber nose 34.

Thus, only the upper part—i.e., the largest diameter—of the conical profile 21 of the centering peripheral surface 12 may come into contact with the inner wall of the non-magnetic prechamber nose 34, the remaining surface of said profile 21 simply approaching said wall more or less closely without ever touching the latter.

FIGS. 7 and 8 show in turn that the centering peripheral surface 12 has a truncated-spherical profile at its peripheral contact line, while the remainder of the centering peripheral surface 12 is purely cylindrical.

In FIGS. 1 and 7, the guide stud valve 50 was shown in the "open" position, the closure axial face 10 arranged on the valve main body 8 being away from the duct closure seat 11 with which it cooperates, while the opening axial face 13 rests on, or is very close to, the chamber-side valve stop 14 arranged in the lamination duct 7 and more precisely, in the non-magnetic prechamber nose 34 which partly forms said duct 7.

It is noted that, being in the "open" position, the guide stud valve 50 forms with the lamination duct 7 an annular-shaped torch ignition prechamber 9, said prechamber 9 communicating on the one hand, with the lamination cavity 4, and on the other hand, with the combustion chamber 3 via gas ejection orifices 16.

The "open" position of the guide stud valve 50 occurs when the pressure of the gases prevailing in the lamination cavity 4 is greater than that prevailing in the combustion chamber 3.

This situation results mainly from the ignition by means 5 of the pilot load 31 previously introduced by the lamination injector 6 into the lamination cavity 4, said pilot load 31 being composed of a highly flammable air-fuel mixture AF previously pressurized by compression means 30 as shown in FIGS. 3 and 6 which, in this case, are formed here of a lamination compressor 32 whatever the type.

It can be noted on FIGS. 3 to 6 that the ignition means 5 are nothing but a spark plug 33 known per se.

FIGS. 2 and 8 show the guide stud valve 50 in the "closed" position, the closure axial face 10 arranged on the valve main body 8 being in contact with the duct closure seat 11 with which it cooperates, while the opening axial face 13 is away from the chamber-side valve stop 14.

As can be easily deduced from FIGS. 1 and 2 and FIGS. 7 and 8, for moving from the "open" position to the "closed" position, the guide stud valve 50 was forced to remain approximately perpendicular to the axis of the lamination duct 7 by the orientation stud 15.

It is to be noted that if the conical profile 21 shown in FIGS. 1 and 2 or the purely cylindrical part of the centering peripheral surface 12 shown in FIGS. 7 and 8 imply that said peripheral surface 12 does not come into contact with the internal wall of the non-magnetic prechamber nose 34 only on a peripheral line of contact of low axial height situated close to the closure axial face 10, the orientation stud 15 for its part comes into contact with the guide axial orifice 17 only at the outlet of the latter into the combustion chamber 3.

Thus, a maximum axial distance is left between the two points of contact of the guide stud valve 50 with the lamination duct 7, which avoids any risk of said valve 50 jamming in said duct 7 by bracing.

To reinforce the angular stability of the guide stud valve 50, it has been shown in FIG. 5 that advantageously, the damping chamber of the valve 18 is connected to the combustion chamber 3 by three gas throttling orifices 20 distributed over the surface of the chamber-side valve stop 14.

This particular configuration forces the opening axial face 13 to adopt an attitude as parallel as possible to said stop 14, particularly when said face 13 arrives only a few hundredths of a millimeter from said stop 14 when opening the guide stud valve 50.

It is understood from the above that, unlike the lamination valve that it replaces as described in patent FR 3,061,743 relating to a "valve ignition prechamber" and its various improvements, the stud valve guide 50 cannot get jammed in the lamination duct 7 with which it cooperates by bracing.

In addition, said stud valve 50 can no longer be oriented in an uncontrolled manner unlike the lamination valve as described in French patent application No. 1904961 relating to an "Ignition insert with active prechamber", the periphery of the latter valve being truncated-spherical to avoid its jamming in its housing.

As a result of the particular configuration of the guide stud valve 50 according to the invention, said valve 50 translates between the duct closure seat 11 and the chamber-side valve stop 14 with which it cooperates while remaining approximately perpendicular to the axis of the lamination duct 7 during its entire stroke, or at least, being capable to tilt only—for example and according to the initial plays chosen and the relative temperatures of the various parts involved—by a maximum of one degree.

As a consequence of the above, the hot gas torches are indeed emitted simultaneously into the combustion chamber 3 by the torch ignition prechamber 9, said torches being of comparable composition, temperature, geometry and power.

This homogeneity of the ignition torches emitted into the combustion chamber 3 of the internal combustion engine which receives the valve ignition prechamber 1 provided with the guide stud valve 50 according to the invention guarantees a high energy efficiency, great stability and optimum safety in particular with regard to the knocking of said motor.

Whether the guide stud valve 50 moves in the direction of the duct closure seat 11 or in the direction of the chamber-side valve stop 14, the stability in orientation of said valve 50 along its two axes perpendicular to that of the lamination duct 7 also makes it possible to guarantee optimum closure of said lamination duct 7 by said valve 50.

The term "optimal closure" means that a clear contact is quickly established between the closure axial face 10 and the duct closure seat 11, which prevents the gases 19 contained in the combustion chamber 3 from entering into the lamination cavity 4 via the lamination duct 7.

Indeed, the orientation guidance imposed by the orientation stud 15 on the guide stud valve 50 as a whole, prevents the latter from opening and closing in two stages as explained in the introduction.

Consequently, only the detachment force exerted on the guide stud valve 50 by the magnetic field produced by the closing magnetic field source 23 shown in FIGS. 3 to 5—in this case a closure permanent magnet 24—determines the force for tight contact of said valve 50 on the duct closure seat 11, and for detaching this valve from this seat.

Thanks to the particular configuration of the guide stud valve 50 according to the invention, the torque exerted on said valve 50 said magnetic field no longer intervenes—or practically no longer intervenes—either during tight contact on the seat or separating, which is advantageous because the force to counter said torque is of very low intensity compared to that required to counter the magnetic force for the tight contact on the seat.

However, prohibiting the gases 19 contained in the combustion chamber 3 from entering the lamination cavity 4 makes it possible to keep the pilot load 31 contained in the lamination cavity 4 intact, this by preventing any mixing of said load 31 with the main load 27 contained in the combustion chamber 3; the latter load 27 can be greatly diluted with air or recirculated exhaust gases.

Keeping the integrity of the pilot load 31 ensures in particular good combustion stability of the pilot load 31 in the lamination cavity 4, and consequently good stability of the internal combustion engine, this being an important condition for the best possible efficiency of the latter.

The straightforward closure of the guide stud valve 50 also allows the cooling of the latter to be optimized on the duct closure seat 11, any gas blade 19 left between said valve 50 and said seat 11 being likely to reduce the amount of heat transferred by said valve 50 to said seat 11.

This straightforward closure is moreover not alone in optimizing the cooling of the guide stud valve 50 according to the invention.

Indeed, the conical profile 21, or purely cylindrical as the case may be, of the centering peripheral surface 12, leaves a small average play between said surface 12 and the inner wall of the non-magnetic prechamber nose 34 and above all, a larger surface area than that left by a truncated-spherical lamination valve as described in French patent application No. 1904961.

In addition to a better sealing of the guide stud valve 50 favoring the proper functioning of the valve damping chamber 18, this better radial proximity and this wider surface left between said cone profile 21 and the non-magnetic prechamber nose 34 promote the heat transfer by said valve 50 to said nose 34, the latter being colder than said valve 50.

It is to be noted—especially in FIG. 5—that advantageously, the gas ejection orifice 16 is connected to the torch ignition prechamber 9 via gas ejection slots 22 arranged in the directly-mounted nonmagnetic sleeve 26 constituting the lamination duct 7, and in the vicinity of the duct closure seat 11.

In addition to the advantage of channeling the hot gases 19 from the lamination cavity 4 through the lamination duct 7 so that said gases 19 are cooled as little as possible in contact with said duct 7 and their flow is facilitated, said slots 22 make exist a larger cold surface close to the closure axial face 10, said surface facing said face 10.

This close cold surface therefore also promotes cooling of the guide stud valve 50 according to the invention.

As can be seen on FIGS. 3 to 5, the spark plug 33 is equipped with an inverter enclosure 28 that is integral with the spark plug 12, as described in the French patent application No. 2001508 entitled "Valve ignition prechamber with reversed direction of combustion", said enclosure 28 receiving a priming load.

It is to be noted in FIGS. 3 and 4 that the ground electrode 35 which is integral with the inverter enclosure 28 consists of a protruding iridium pad 29 which faces the central electrode 36 of the spark plug 33, said central electrode 36 also being made of iridium.

In this case, moreover, three main ejection nozzles strongly offset towards the periphery of the inverter enclosure 28 connect the latter with the interior of the lamination cavity 4, said three nozzles being barely visible on the figures, given their smallness.

A variant of the guide stud valve 50 according to the invention is shown in FIG. 6, according to which the source 23 of the closing magnetic field is a closure permanent magnet 24 which produces a magnetic field, which can be either countered or amplified by a respectively opposite or matching magnetic field induced in a piloting coil core 37 by a magnetic field piloting coil 38 being passed through by an electric current which intensity is controlled by a calculator 39.

Advantageously, the piloting coil core 37 can be made of a material with high magnetic permeability and low magnetic remanence.

According to this particular configuration of the guide stud valve 50 according to the invention, the magnetic field piloting coil 38 can, depending on the intensity and direction of the current passing through it, annihilate the magnetic return of the guide stud valve 50 on the duct closure seat 11 produced by the closure permanent magnet 24, reinforce said magnetic return, or vary the power of said return on more or less long time scales which can range from a few degrees of rotation of a crankshaft of an internal combustion engine, to several seconds or even several minutes.

The dynamic piloting of the magnetic return of the guide stud valve 50 according to the invention makes it possible in particular to avoid any residual bracing of said valve 50 during the opening of the latter following the combustion of the pilot load 31 contained in the lamination cavity 4.

Indeed, if the orientation stud 15 opposes the tilting of the guide stud valve 50, said tilting resulting from the torque exerted by the magnetic field on said valve 50, the removal of said field by the magnetic field piloting coil 38 cancels the very source of said tilting.

For this, the calculator 39 can suppress the magnetic return of the guide stud valve 50 a few hundred microseconds before said valve 50 opens under the effect of the combustion of the pilot load 31.

Once the ignition torches are emitted by the torch ignition prechamber 9 in the combustion chamber 3, the calculator 39 can restore the magnetic return of the guide stud valve 50 so as to bring the latter back into contact with the duct closure seat 11, with less impact.

This strategy for piloting the magnetic field for the return of the guide stud valve 50 according to the invention makes it possible to greatly reduce the abrasive wear of said valve 50 and of the lamination duct 7 in which it is housed with small play.

In addition, piloting the magnetic field for the return of the guide stud valve 50 makes it possible to ensure the cold start of an internal combustion engine at low temperatures by allowing the lamination cavity 4 to no longer be filled with oxidizer-fuel mixture AF via the lamination injector 6, but via the gas ejection orifices 16.

In this case, the guide stud valve 50 is left open during the compression of said engine, so as to fill the lamination cavity 4.

When during such compression the pressure in the lamination cavity 4 reaches the re-condensation limits of the oxidizer-fuel mixture AF contained in said cavity 4, the guide stud valve 50 is forced into closure by the calculator 39, which ensures the perfect combustion of the mixture and provides an efficient solution to the difficulty or even impossibility of starting the engines with ignition prechamber at very low temperatures.

The piloting of the magnetic field for the return of the guide stud valve 50 allows in addition to optimize the emptying of the lamination cavity 4 between two fillings, so as to minimize the amount of residual flue gas from the previous cycle and to improve the combustion of pilot load 31 in said cavity 4.

Indeed, once the ignition torches are emitted into combustion chamber 3 via the gas ejection orifices 16, forcing the closure of the guide stud valve 50 at the time when the pressure in the lamination cavity 4 is lowest allows to achieve the expected result.

FIGS. 7 and 8 show the opening permanent magnet 45, which can be provided according to the invention to attract the guide stud valve 50 in the direction of the chamber-side valve stop 14.

Said magnet 45 cooperates with the closure permanent magnet 24 and the magnetic field piloting coil 38. Said magnet 45 allows the closure of said guide stud valve 50 to be forced on the duct closure seat 11 as appropriate, but it allows, as the case may be, the opening of said valve 50 to be forced in the direction of the chamber-side valve stop 14.

Thus, the calculator 39 can, via the magnetic field piloting coil 38, neutralize the magnetic field of the closure permanent magnet 24 produced by the latter at the level of the guide stud valve 50.

In this case, only magnetic field produced by the opening permanent magnet 45 remains at the guide stud valve 50, the latter being attracted in the direction of the chamber-side valve stop 14.

Conversely, the calculator 39 can, depending on the intensity and direction of the electric current it circulates in the magnetic field piloting coil 38, either allow the magnetic field produced at the level of the guide stud valve 50 by the closure permanent magnet 24 to act, or reinforce this magnetic field.

Since the magnetic field produced by the closure permanent magnet 24 is naturally more intense at the level of the guide stud valve 50 than that produced by the opening permanent magnet 45, if no electrical current circulates in the magnetic field piloting coil 38, said valve 50 is drawn in the direction of the duct closure seat 11.

It is easily understood that the calculator 39 can advantageously give the advantage to one or the other of the antagonistic magnetic fields of the closure permanent magnet 24 or of the opening permanent magnet 45 via the magnetic field pilot coil 38, this being provided so as to force as necessary the guide stud valve 50 to go in the direction of the duct closure seat 11, or to go in the direction of the chamber-side valve stop 14.

This "pull-push" function of the guide stud valve 50 managed by the calculator 39 makes it possible in particular to unlock said valve 50 if it is subject to clogging, to force it to open, especially if gravity does not help it on a flat piston engine, or to optimize the filling and emptying of the lamination cavity 4 under all circumstances.

It is noted in FIGS. 7 and 8 that the orientation stud 15 comprises a damping shoulder 46 which cooperates with a damping counterbore 47 arranged at the inlet of the guide axial orifice 17, said counterbore 47 opening into the valve damping chamber 18.

This particular configuration of the guide stud valve 50 according to the invention allows the latter to travel the first part of its stroke towards the chamber-side valve stop 14 while being braked as little as possible by the valve damping chamber 18.

Indeed, as long as the damping shoulder 46 has not reached the level of the damping counterbore 47, the gases contained in the valve damping chamber 18 can very freely exit the latter in the direction of the combustion chamber 3, via the play left between said shoulder 46 and said counterbore 47, then via the depressurization ducts 48 as shown in FIGS. 7 and 8.

When the damping shoulder 46 reaches the level of the damping counterbore 47, the gases are strongly laminated by the passage restriction thus formed, so that during the second part of its stroke towards the chamber-side valve stop 14, the guide stud valve 50 is braked, which correspondingly reduces the power of any impact that may occur between the opening axial face 13 and the chamber-side valve stop 14.

This particular configuration of the guide stud valve 50 according to the invention therefore gives the latter a longer service time.

It is to be noted that the exemplary embodiment of the guide stud valve 50 according to the invention which has just been described is non-limiting.

Indeed, the guide stud valve 50 according to the invention can be applied to areas other than just internal combustion engines. Said valve 50 can for example be applied to gas nailers, firearms, or any device requiring the firing of a main load by means of a pilot load with the best possible efficiency.

The possibilities of the guide stud valve 50 according to the invention are not limited to the applications which have just been described and it should also be understood that the above description has only been given by way of example and that it in no way limits the field of said invention, from which one would not depart by replacing the details of execution described by any other equivalent.

The invention claimed is:

1. An oriented valve (50) for a valve ignition prechamber (1) that is arranged in an internal combustion engine cylinder head (2) that covers a combustion chamber (3), said valve ignition prechamber (1) having a lamination cavity (4) in which emerges ignition means (5) and at least one lamination injector (6), said lamination cavity (4) being connected to the combustion chamber (3) by a lamination duct (7) that houses the oriented valve (50) in order to form with the oriented valve (50) a torch ignition prechamber (9) that connects the lamination cavity (4) with the combustion chamber (5) by means of at least one gas ejection orifice (16), the oriented valve (50) comprising:

a valve main body (8) housed with small play in the lamination duct (7);

a closure axial face (10) arranged on the valve main body (8) and configured to rest in whole or in part on a duct closure seat (11) which the lamination duct (7) exhibits in order to close the lamination duct (7) and isolate the lamination cavity (4) from the combustion chamber (5);

a centering peripheral surface (12) located at a periphery of the valve main body (8), said peripheral surface (12) being configured to contact an internal wall of the lamination duct (7) to center said valve main body (8) in said lamination duct (7);

an opening axial face (13), which is arranged on the valve main body (8) opposite the closure axial face (10) and which is configured, when the closure axial face (10) does not rest on the duct closure seat (11), to bear on a chamber-side valve stop (14) arranged in the lamination duct (7);

an orientation stud (15), which is fixedly secured to the valve main body (8) and which protrudes from the opening axial face (13);

a guide axial orifice (17), arranged in or near the chamber-side valve stop (14) and in which is housed the orientation stud (15) with small radial play, said orientation stud (15) configured to slide longitudinally in said axial orifice (17) without ever completely coming out; and a valve damping chamber (18) formed by the lamination duct (7), the opening axial face (13), and the chamber-side valve stop (14), wherein a volume of said valve damping chamber (18) is maximum when the closure axial face (10) rests on the duct closure seat (11), and minimum when the opening axial face (13) rests on the chamber-side valve stop (14), and wherein at least one gas throttling orifice (20) connects the valve damping chamber (18) and the combustion chamber (3) so that a gas (19) can flow between the valve damping chamber (18) and the combustion chamber (3) via said throttling orifice (20).

2. The oriented valve according to claim 1, wherein the guide axial orifice (17) passes through the lamination duct (7) so as to connect the valve damping chamber (18) and the combustion chamber (3), so that a gas (19) can circulate between the valve damping chamber (18) and the combustion chamber (3) via the small radial play between the orientation stud (15) and the guide axial orifice (17).

3. The oriented valve according to claim 2, wherein the orientation stud (15) comprises a damping shoulder (46) which cooperates with a damping counterbore (47) arranged at an inlet of the guide axial orifice (17), said damping counterbore (47) opening into the valve damping chamber (18).

4. The oriented valve according to claim 3, wherein the damping counterbore (47) is directly or indirectly connected to the combustion chamber (3) by at least one depressurization duct (48).

5. The oriented valve according to claim 1, wherein the gas ejection orifice (16) is connected to the torch ignition prechamber (9) by means of at least one gas ejection slot (22) arranged in the lamination duct (7) and in a vicinity of the duct closure seat (11).

6. The oriented valve according to claim 1, wherein at least one of the valve main body (8) and the orientation stud (15) is attracted towards the lamination cavity (4) by a closure magnetic field source (23).

7. The oriented valve according to claim 6, wherein the magnetic closing field source (23) consists of at least one closure permanent magnet (24) which produces a magnetic field, where said magnetic field can be either countered or amplified by a respectively opposite or matching magnetic field induced in a piloting coil core (37) by a magnetic field piloting coil (38).

8. The oriented valve according to claim 1, wherein at least one of the valve main body (8) and the orientation stud (15) is attracted towards the chamber-side valve stop (14) by an opening magnetic field source (44).

9. The oriented valve according to claim 1, wherein the lamination duct (7) comprises a directly-mounted non-magnetic sleeve (26), on which the duct closure seat (11) is arranged.

10. An oriented valve for a valve ignition prechamber (1) that is arranged in an internal combustion engine cylinder head (2) that covers a combustion chamber (3), said valve ignition prechamber (1) having a lamination cavity (4) in which emerges ignition means (5) and at least one lamination injector (6), said lamination cavity (4) being connected to the combustion chamber (3) by a lamination duct (7) that houses the oriented valve (50) in order to form with the oriented valve (50) a torch ignition prechamber (9) that connects the lamination cavity (4) with the combustion chamber (5) by means of at least one gas ejection orifice (16), the oriented valve (50) comprising:

a valve main body (8) housed with small play in the lamination duct (7);

a closure axial face (10) arranged on the valve main body (8) and configured to rest in whole or in part on a duct closure seat (11) which the lamination duct (7) exhibits in order to close the lamination duct (7) and isolate the lamination cavity (4) from the combustion chamber (5);

a centering peripheral surface (12) located at a periphery of the valve main body (8), said peripheral surface (12) being configured to contact an internal wall of the lamination duct (7) to center said valve main body (8) in said lamination duct (7);

an opening axial face (13), which is arranged on the valve main body (8) opposite the closure axial face (10) and which is configured, when the closure axial face (10) does not rest on the duct closure seat (11), to bear on a chamber-side valve stop (14) arranged in the lamination duct (7);

an orientation stud (15), which is fixedly secured to the valve main body (8) and which protrudes from the opening axial face (13);

a guide axial orifice (17), arranged in or near the chamber-side valve stop (14) and in which is housed the orientation stud (15) with small radial play, said orientation stud (15) configured to slide longitudinally in said axial orifice (17) without ever completely coming out; and a valve damping chamber (18) formed by the lamination duct (7), the opening axial face (13), and the chamber-side valve stop (14), wherein a volume of said valve damping chamber (18) is maximum when the closure axial face (10) rests on the duct closure seat (11), and minimum when the opening axial face (13) rests on the chamber-side valve stop (14), wherein the centering peripheral surface (12) has a conical profile (21).

\* \* \* \* \*